(12) United States Patent
Kuwajima et al.

(10) Patent No.: US 7,068,469 B2
(45) Date of Patent: Jun. 27, 2006

(54) HEAD SUPPORTING ASSEMBLY, HEAD DRIVING ASSEMBLY, AND DISK DRIVE APPARATUS

(75) Inventors: Hideki Kuwajima, Kyoto (JP); Zhisheng Deng, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 122 days.

(21) Appl. No.: 10/632,860

(22) Filed: Aug. 4, 2003

(65) Prior Publication Data

US 2004/0090711 A1 May 13, 2004

(30) Foreign Application Priority Data

Aug. 7, 2002 (JP) .............................. 2002-229747

(51) Int. Cl.
*G11B 5/48* (2006.01)
(52) U.S. Cl. .................................................. 360/244.5
(58) Field of Classification Search ............. 360/244.5, 360/244.8, 245.2, 244.6, 294.3, 98.07
See application file for complete search history.

(56) References Cited

U.S. PATENT DOCUMENTS

| | | | |
|---|---|---|---|
| 4,286,297 A | | 8/1981 | Root et al. |
| 4,309,732 A | | 1/1982 | Kronfeld et al. |
| 5,936,803 A | * | 8/1999 | Berding .................... 360/244.8 |
| 6,504,684 B1 | * | 1/2003 | Danielson et al. ....... 360/244.8 |
| 6,728,072 B1 | * | 4/2004 | Van Sloun et al. ...... 360/244.6 |
| 6,731,472 B1 | * | 5/2004 | Okamoto et al. ........ 360/294.3 |
| 6,778,362 B1 | * | 8/2004 | Davis et al. ............. 360/244.8 |
| 6,813,119 B1 | * | 11/2004 | Okamoto et al. ........ 360/245.2 |

FOREIGN PATENT DOCUMENTS

| | | |
|---|---|---|
| EP | 0 342 625 | 11/1989 |
| EP | 0 831 463 | 3/1998 |
| JP | 9-82052 | 3/1997 |

OTHER PUBLICATIONS

Patent Abstracts of Japan, vol. 0111, No. 34 (P-571), Apr. 28, 1987 (r/28/87) & JP 61 273783 A (Fujitsu, Ltd.), Dec. 4, 1986, Abstract (in English).

* cited by examiner

*Primary Examiner*—William Klimawicz
*Assistant Examiner*—Mark Blouin
(74) *Attorney, Agent, or Firm*—Wenderoth, Lind & Ponack, L.L.P.

(57) ABSTRACT

A head supporting assembly has high flexibility, while applying a necessary and sufficient pressing force to a head, is excellent in shock resistance, and provides a stabilized pressing force not affected by manufacturing variations, and a head driving assembly and a disk drive apparatus use such head supporting assembly. The head supporting assembly is configured to have a base arm provided with a rotation-supporting portion for supporting a head supporting member for rotation in a direction toward and away from a disk surface and a resilient member having one end thereof connected to an end of a supporting arm and the other end connected to the base arm. The rotation-supporting portion of the base arm is provided at such a position that a head mount is allowed to be displaced relative thereto by pressing of the rotation-supporting portion in the pressing direction.

19 Claims, 8 Drawing Sheets

HEAD SUPPORTING ASSEMBLY, HEAD DRIVING ASSEMBLY, AND DISK DRIVE APPARATUS

FIELD OF THE INVENTION

The present invention relates to a head supporting assembly and a head driving assembly using a head for recording and reproduction on a disk, as well as a disk drive apparatus using the same.

BACKGROUND OF THE INVENTION

With the recent rapid expansion of the market for portable electronic equipment (such as PDAs and mobile telephones), accompanied by development of small-sized apparatuses, there are increasing demands for disk drive apparatus as one of the data storage means in such equipment having enhanced portability, namely that are small-sized and low-profiled, and having higher shock resistance and reliability. There have been proposed various methods for disk drive apparatus meeting such demand for high shock resistance.

As an example of a conventional disk drive apparatus including a head, a conventional disk drive apparatus in a magnetic recording and reproducing apparatus such as a hard disk drive apparatus will be described with reference to the accompanying drawings.

Figure 9:
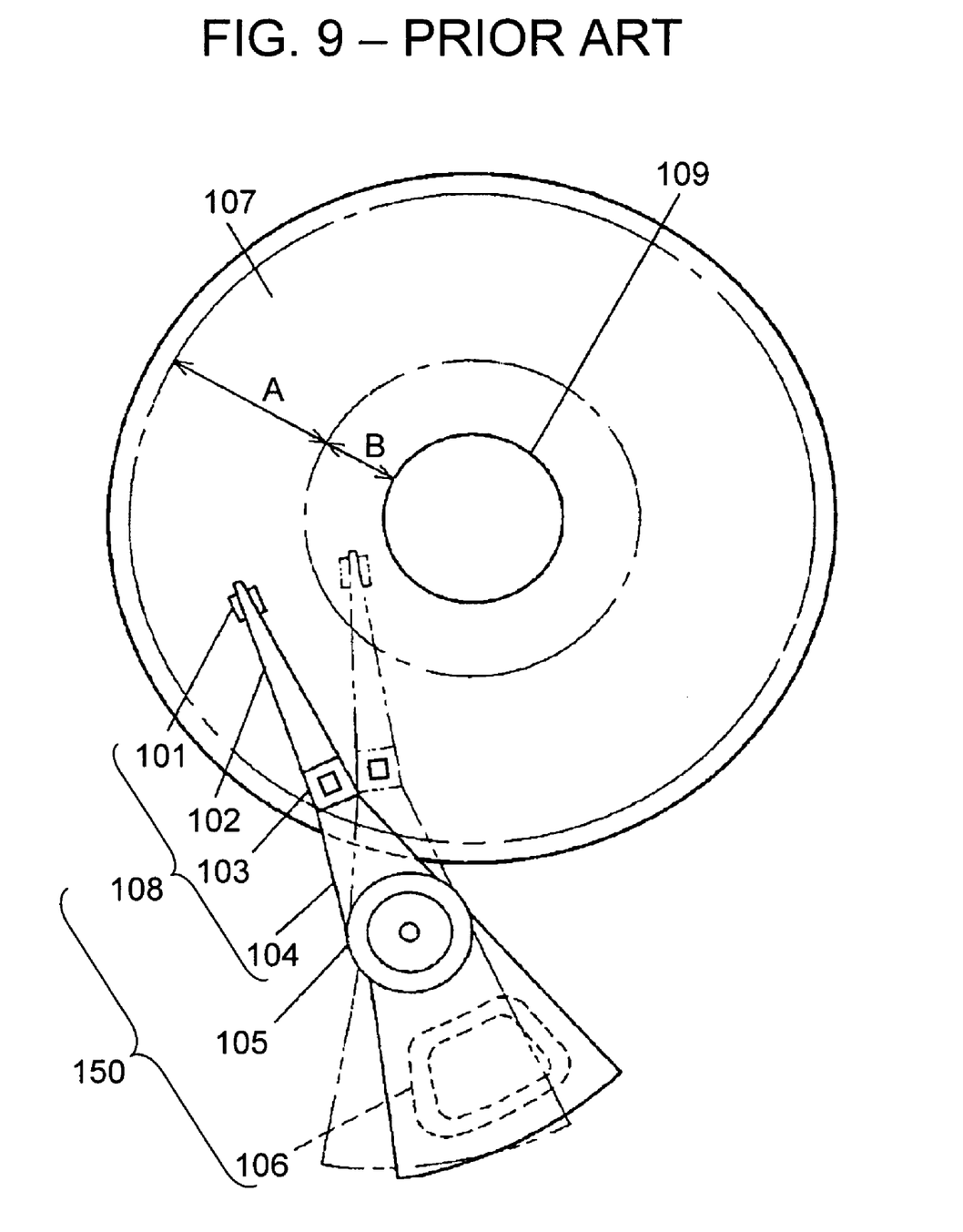
FIG. 9 is a plan view showing a configuration of a conventional magnetic recording and reproducing apparatus.

FIG. 9 is a plan view showing a configuration of a conventional magnetic recording and reproducing apparatus. In FIG. 9, head supporting assembly 108 is made up of suspension 102 and plate spring portion 103, which are relatively low in rigidity, and supporting arm 104 relatively high in rigidity. On the underside of one end of suspension 102, there is provided slider 101 with a magnetic head (not shown) mounted thereon.

Magnetic recording medium 107 is provided so as to be rotated by spindle motor 109. When recording/reproduction is performed by the magnetic recording/reproducing apparatus, the magnetic head mounted on slider 101 is allowed to fly at a predetermined distance above magnetic recording medium 107 depending on the relationship between a lifting force caused by an airstream generated on slider 101 due to rotation of magnetic recording medium 107 and an urging force produced by head supporting assembly 108 to urge slider 101 toward magnetic recording medium 107. At the time of recording/reproduction, head supporting assembly 108 is rotated around bearing portion 105 by action of voice coil 106 provided on supporting arm 104 and, meanwhile, the magnetic head mounted on slider 101 is positioned into a desired track on magnetic recording medium 107 so that recording/reproduction is performed.

The magnetic recording and reproducing apparatus shown in FIG. 9 is on the contact-start-stop system, as generally called, (hereinafter referred to as the CSS system). The system is characterized by that, while magnetic recording medium 107 is stopped, the magnetic head is on magnetic recording medium 107 in contact therewith, and while recording/reproduction is performed, the magnetic head provided on slider 101 is lifted up from magnetic recording medium 107. In such CSS system, magnetic recording medium 107 is divided into region A that is magnetically recordable and region B to which the magnetic head is retreated during a non-rotation period as shown in FIG. 9. When the rotation of magnetic recording medium 107 is to be stopped, the magnetic head lifted up is first shifted into region B and then the rotating speed is lowered, whereby the airstream between magnetic recording medium 107 and slider 101 is reduced to decrease the lifting force and, finally, the magnetic head comes into contact with magnetic recording medium 107 to be stopped in this state.

Therefore, magnetic recording medium 107 in the CSS system is arranged such that the surface of region B is formed rougher than the surface of region A to thereby prevent occurrence of such a trouble that the magnetic head adheres to magnetic recording medium 107 at the time when magnetic recording medium 107 stops its rotation, and hence, at the time of restarting, magnetic recording medium 107 suffers mechanical and magnetic damage.

Figure 10:
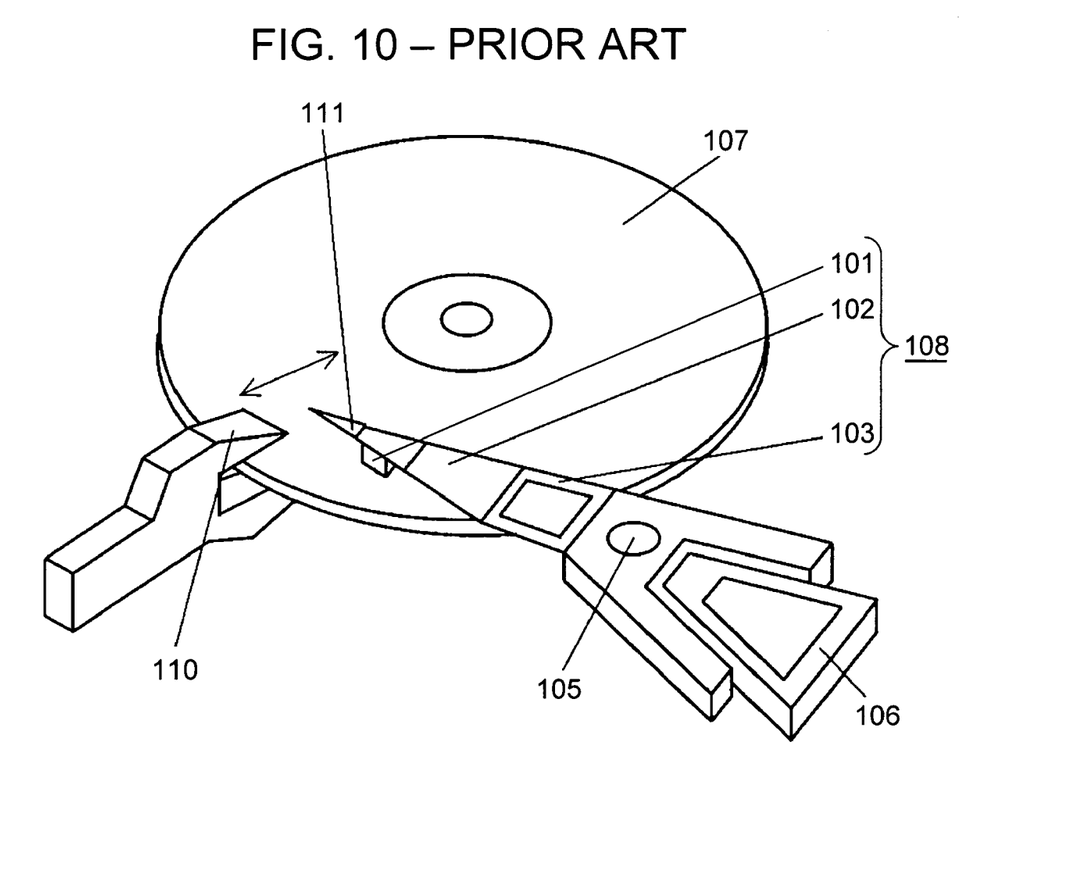
FIG. 10 is a schematic view in perspective showing a configuration of a conventional magnetic recording and reproducing apparatus on the L/UL system.

As another method for supporting the head, there is the load-unload system (hereinafter referred to as the L/UL system). FIG. 10 is a perspective view showing a magnetic recording and reproducing apparatus on the L/UL system. In FIG. 10, head supporting assembly 108 has a configuration similar to that of head supporting assembly 108 of the CSS system shown in FIG. 9. In this case, however, when the magnetic recording and reproducing apparatus is stopped, head supporting assembly 108 is rotated around bearing portion 105 to be shifted to the outside of magnetic recording medium 107. In this case, since there is provided magnetic head supporting portion 110 outside magnetic recording medium 107, projected portion 111 provided at the front end of suspension 102 is caused to land on the tapered portion so that slider 101 and the magnetic head come to be supported thereon separated from magnetic recording medium 107.

In the head supporting assembly of the magnetic recording and reproducing apparatus, the urging force to urge the slider toward the magnetic recording medium with a predetermined load is chiefly developed by the plate spring portion, while the suspension is configured to have flexibility. This is for allowing the slider to stably fly up even when the disk produces up-and-down movements when recording/reproduction is performed on the disk so that the head is prevented from coming off a predetermined track position, i.e., from exhibiting the so-called off-track phenomenon, and also for allowing the head to certainly follow up-and-down movements of the disk. Therefore, it is required that the urging force necessary for urging the slider toward the disk be certainly secured by the plate spring portion.

Further, when manufacturing variations are produced in the suspension, the urging force urging the head toward the disk by the plate spring portion configured by bending the suspension portion may vary. In order to stably maintain the distance between the head and the disk by having such variations absorbed, it is required to further lower the rigidity of the spring portion of the suspension. However, if the rigidity of the spring portion of the suspension is lowered, the resonance frequency of the suspension is lowered, and thereby an unstable phenomenon in which bending or twisting vibration mode is produced occurs to cause the off-track trouble of the head.

Further, in the conventional head supporting mechanism, its center of gravity is positioned closer to the portion where the head is mounted than the plate spring portion. Therefore, when the magnetic recording and reproducing apparatus is subjected to an external shock or the like, the balance of force at the slider portion between the lifting force due to the airstream generated by the rotation of the disk and the urging force to urge the slider toward the disk is lost and such a phenomenon of the slider jumping off the disk surface tends to occur. When such jumping occurs, the slider sometimes collides with the disk to cause magnetic or mechanical damage to the disk. Such problems occur not only in the above described magnetic recording and reproducing apparatus but also in other disk drive apparatus having a floating head such as an optical disk drive apparatus and a magneto-optic disk drive apparatus.

The present invention was made to overcome the above mentioned problems and it has an object to provide a head supporting assembly, as well as a head driving assembly, capable of securing stabilized urging force not affected by manufacturing variations and that is excellent in shock resistance, and to provide a disk drive apparatus using the same.

SUMMARY OF THE INVENTION

The head supporting assembly of the present invention comprises a head for performing at least one of recording and reproduction on a disk, a head supporting member made up of the head, a head mount having the head mounted thereon, and a supporting arm having the head mount attached to one end thereof, a base arm provided with a rotation-supporting portion for supporting the head supporting member for rotation in the direction toward and away from the disk surface, and a resilient member having one end thereof connected to the other end of the supporting arm and the other end connected to the base arm for providing an urging force for urging the head supporting portion toward the disk, in which the rotation-supporting portion of the base arm is provided at such a position that the head mount is allowed to be displaced relative thereto by pressing of the rotation-supporting portion in the pressing direction.

By virtue of the described configuration, the head supporting member can be directly disposed on the base arm. Accordingly, a member having rigidity and a member having resilience can be provided independently of each other. Hence, the support arm portion having high rigidity can be provided on the base arm and accordingly the resonance frequency of the supporting arm can be set high. Further, the rotation-supporting portion can be provided in such a position that allows the head supporting portion to be displaced downward at all times, it becomes possible to stably apply an urging force to the head mount.

DETAILED DESCRIPTION OF THE INVENTION

Exemplary embodiments of the present invention will be described with reference to the accompanying drawings.

FIRST EMBODIMENT

Figure 1:
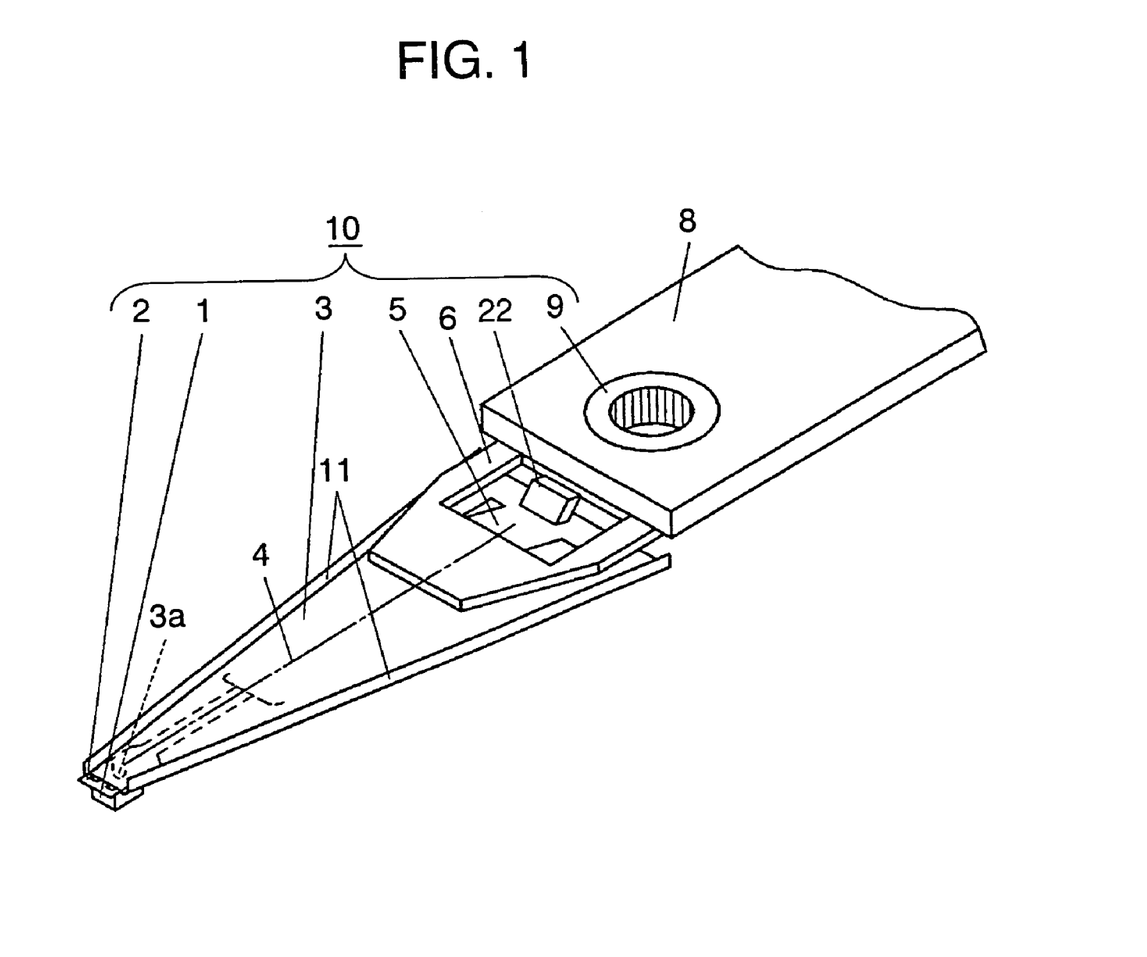
FIG. 1 is a perspective view of a main portion of a head supporting assembly in a first embodiment of the present invention.
Figure 2:
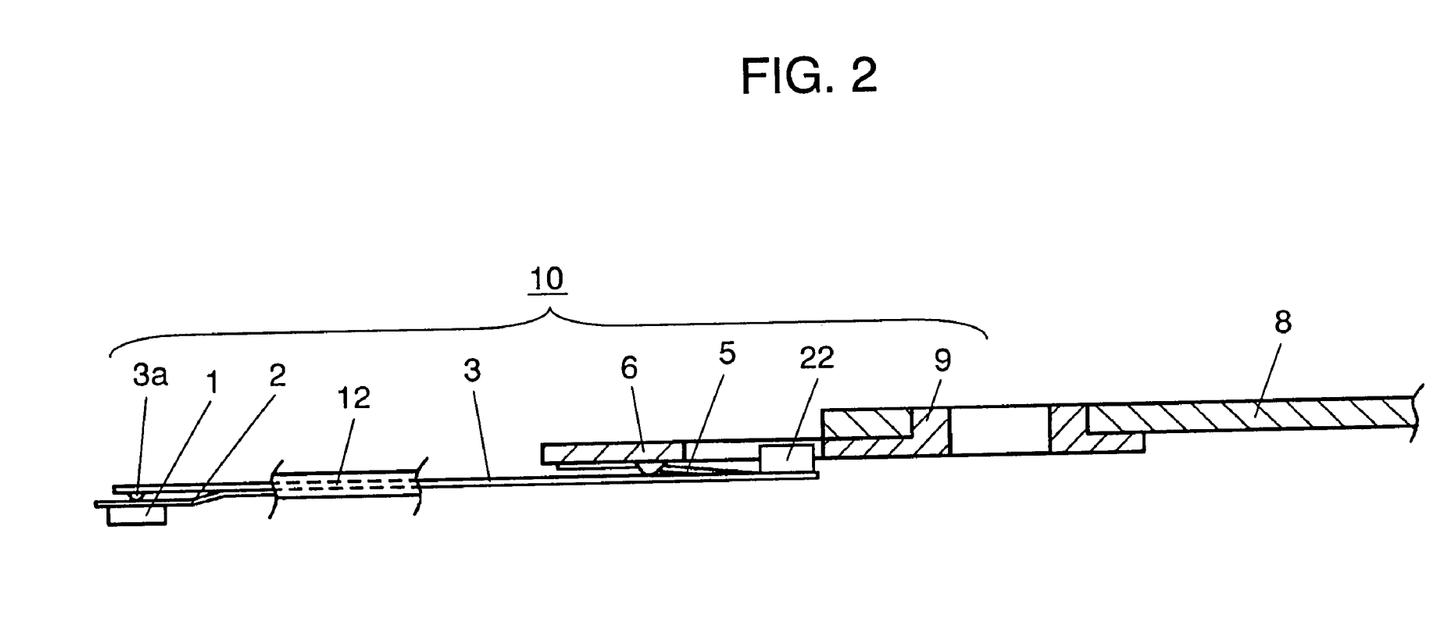
FIG. 2 is a side view of the main portion of the head supporting assembly.
Figure 3:
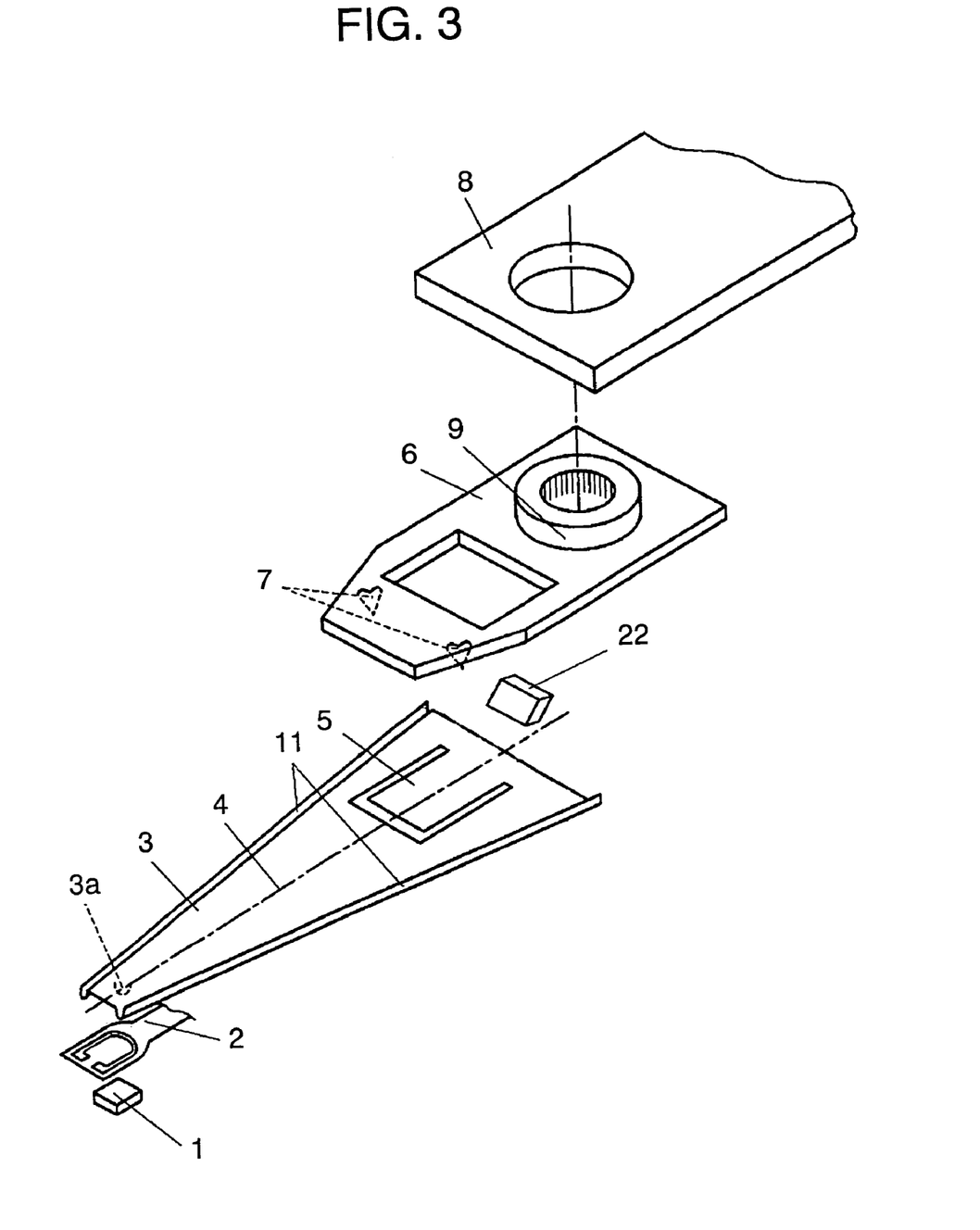
FIG. 3 is an exploded view in perspective of the main portion of the head supporting assembly.

FIG. 1, FIG. 2, and FIG. 3 are drawings showing a head supporting assembly in a first embodiment of the present invention. FIG. 1 is a perspective view of a main portion showing a configuration of the head supporting assembly, FIG. 2 is a side view of the main portion, and FIG. 3 is an exploded view in perspective of the main portion. A description will be given with a magnetic recording and reproducing apparatus taken as an example of a disk drive apparatus.

In FIG. 1, FIG. 2, and FIG. 3, slider 1 as a head mount having a magnetic head (not shown) mounted thereon is fixed to a flexure 2, formed integral of a metallic thin plate of SUS or the like and a flexible wiring board, also serving as a so-called gimbals, and flexure 2 is fixed to supporting arm 3. The top of dimple 3a provided on supporting arm 3 is in abutment with flexure 2 and slider 1 is fixed to flexure 2 for movement around the top of dimple 3a.

A portion of supporting arm 3 around center line 4 in the longitudinal direction is cut off such that plate spring portion 5, as a tongue-shaped resilient member, is formed therein. One end of plate spring portion 5 is fixed to first base arm 6, as a base arm, by a known method such as spot welding, ultrasonic welding, or laser welding. Incidentally, plate spring portion 5 may be made of a different material than supporting arm 3. In the case where they are made of different materials, one end of a material member to become the tongue-shaped plate spring is fixed to supporting arm 3 and the other end is fixed to first base arm 6 by a known method of welding such as noted above.

Further, first base arm 6 is provided with two pivots 7, serving as a rotation-supporting portion, at positions bilaterally symmetric about center line 4 in the longitudinal direction of supporting arm 3. Tops of two pivots 7 are in abutment with supporting arm 3. Thereby, supporting arm 3 is adapted to be rotated as pressed against a resilient force of plate spring portion 5 of supporting arm 3 fixed to first base arm 6, with the tops of two pivots 7 disposed on first base arm 6 acting as the rotation-supporting portion. Namely, an urging force to urge slider 1 toward a recording medium (not shown) is developed by having slider 1 fixed to supporting arm 3 pressed on the surface of the recording medium. Further, there is provided joint portion 9 formed of a projection in a hollow cylindrical profile, for example, at the other end of first base arm 6 for integrating the same with second base arm 8 as a base arm.

Further, the center of gravity of the head supporting member including slider 1, flexure 2, supporting arm 3, and balancer 22 is set to pass the line connecting the tops of two pivots 7 disposed on first base arm 6 as the rotation-supporting portion of supporting arm 3. Head supporting arm 10 is made up of slider 1 with the magnetic head mounted thereon, flexure 2, balancer 22, supporting arm 3 including plate spring portion 5, and first base arm 6.

Further, while plate spring portion 5 is formed by cutting off a portion around center line 4 in the longitudinal direction of supporting arm 3, both left and right side faces of supporting arm 3 are formed to have continuous shapes substantially all the way along their respective lengths. Therefore, by subjecting all the way along the lengths of both the left and right side faces to a bending process, side reinforced portions 11 can be provided. By the provision of side reinforced portions 11, the rigidity of supporting arm 3 can be greatly enhanced so that the resonance frequency of supporting arm 3 can be greatly increased from a level of around 2 kHz in the prior art to a value of around 10 kHz. Hence, the rotational speed of head supporting arm 10 can be greatly increased to enhance the access speed.

Second base arm 8 has a hole portion at one end thereof for connection with first base arm 6 and the same is connected with first base arm 6 including slider 1 by a known method such as caulking. As will be discussed later when a disk drive apparatus is described, a drive means such as a voice coil motor, for example, is disposed opposite to first base arm 6 across the bearing portion. Further, second base arm 8 may have such a configuration that is linearly movable in a diametrical direction of the disk.

Head supporting assembly 12 is made up of head supporting arm 10 and second base arm 8, and the same is adapted to various sizes of the recording medium by changing the arm length of either first base arm 6 or second base arm 8. Therefore, a practical configuration can be provided when a magnetic recording and reproducing apparatus using recording media different in size and kind is standardized.

The above discussed urging force to allow slider 1 to press the surface of the recording medium can be set as desired by changing the material or thickness of plate spring portion 5, the height of the top of pivot 7, or the connected position of supporting arm 3 with plate spring portion 5 or fixed position of plate spring portion 5 with first base arm 6. This, in turn, means that the urging force varies when the positional relationship or the height of the top of pivot 7 noted above suffers manufacturing variations. Hence, there arises such a deterioration in quality of disk drive apparatuses as varying from apparatus to apparatus of the flying height of the head over the disk while the disk is rotated. Namely, while urging force F causing slider 1 to press the surface of the recording medium is determined by $$F=Kx \quad (1),$$

where K is the spring constant of plate spring portion 5 of the head supporting assembly and x is displacement of slider 1, urging force F varies greatly when both spring constant K and displacement x vary by existence of variations in the height of the top of pivot 7 and the like.

Figure 4A:
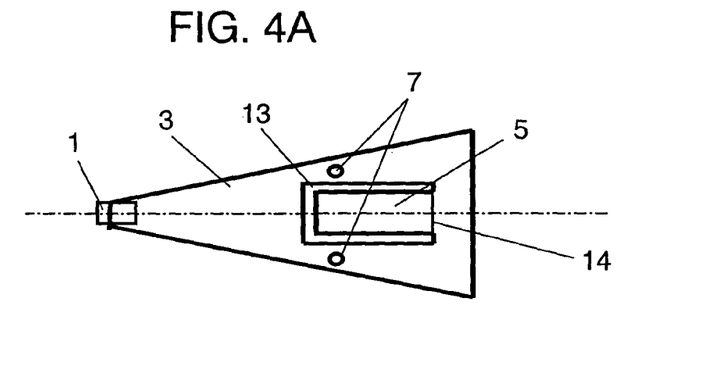
FIG. 4A is a plan view of a supporting arm of the head supporting assembly.
Figure 4B:
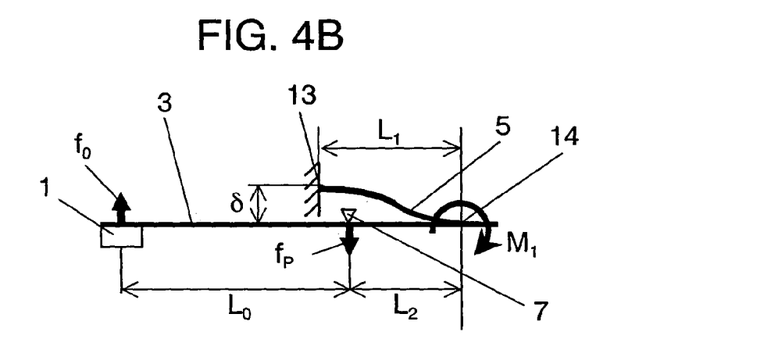
FIG. 4B is a side view showing modeled supporting arm 3 of a head supporting assembly for obtaining a balance of force in the head supporting assembly.

FIG. 4A is a plan view of supporting arm 3 of the head supporting assembly, in which plate spring portion 5 is fixed to first base arm 6 at fixed portion 13 and connected to supporting arm 3 at connected portion 14. FIG. 4B is a side view showing supporting arm 3, modeled, of the head supporting assembly for obtaining the balance of force.

In the drawing, when pivot 7 is pressed down so that a displacement of δ is produced in supporting arm 3, the balance of force is obtained with use of load $f_0$ of slider 1, an internal pressure $f_p$ of pivot 7, and moment $M_1$ acting on connected portion 14 between plate spring portion 5 and supporting arm 3. Here, the distance from the center of gravity of slider 1 to pivot 7 is denoted by $L_0$, the distance from pivot 7 to connected portion 14 is denoted by $L_2$, the distance from fixed portion 13 to connected portion 14 is denoted by $L_1$, and the ratio of $L_2$ to $L_1$, $L_2/L_1$, is denoted by m, i.e., $$L_2=mL_1 \quad (2).$$

To obtain spring constant from the balancing condition when an outer force denoted by $f_0$ is applied to slider 1, spring constant K is expressed as $$K=[EI/(L_0^2 \times L_1)] \times (3\ m^2 - 3m + 1) \quad (3),$$

where E is Young's modulus of supporting arm 3 and I is the geometrical moment of inertia of supporting arm 3. Namely, spring constant K becomes a quadratic function of m.

Figure 5:
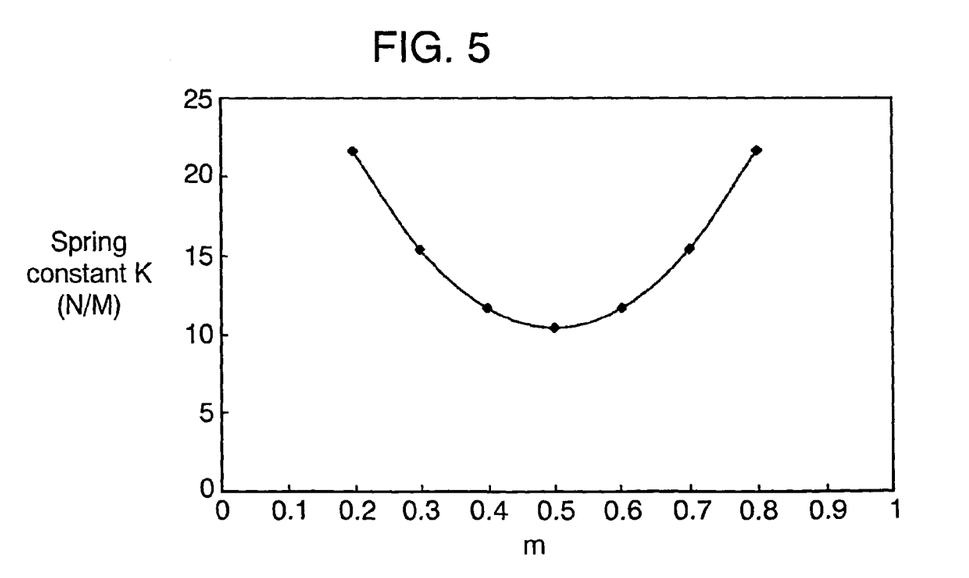
FIG. 5 is a characteristic curve showing a relationship between m according to the model in FIGS. 4A and 4B and spring constant K in the first embodiment.

FIG. 5 is a characteristic curve showing a relationship between m and spring constant K when the shape of plate spring portion 5 is bilaterally symmetric about center line 4 in the longitudinal direction of supporting arm 3 as shown in FIGS. 4A and 4B. As apparent from FIG. 5, spring constant K assumes its minimum value at a specified value of m. According to FIG. 5, in the case where the plate spring is bilaterally symmetric, it becomes possible to minimize the spring constant at m=0.5, i.e., by setting the pivot position at the midpoint of length $L_1$.

Figure 6A:
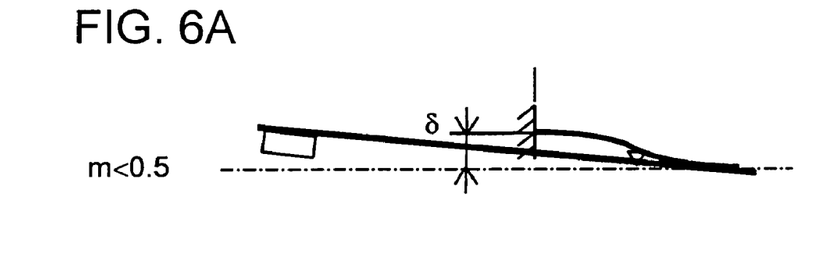
FIGS. 6A–C are side views showing modeled states of the supporting arm relative to different values of m.
Figure 6B:
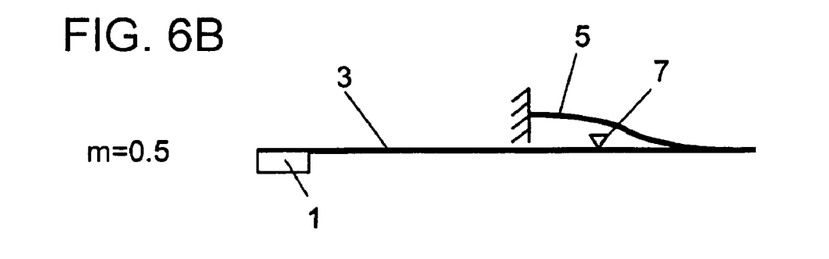
Figure 6C:
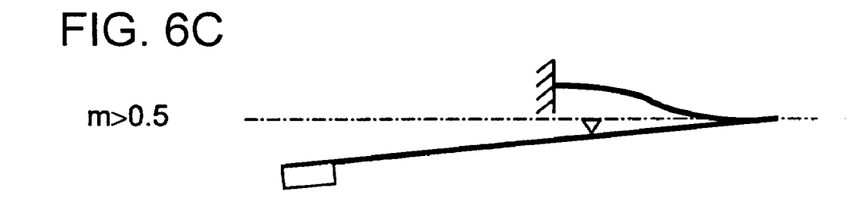

FIGS. 6A–C are side views showing modeled states of supporting arm 3 relative to different values of m. As shown in FIGS. 6A–C, in the case where m<0.5, slider 1 is turned up when pivot 7 is pressed down to produce displacement δ; in the case where m=0.5, supporting arm 3 makes downward parallel displacement of a distance the same as the pressed-down distance; and in the case where m>0.5, slider 1 turns down.

Therefore, in order to provide an urging force to urge slider 1 toward the recording medium such that slider 1 presses the surface of recording medium (not shown), it is known to be practicable if m is set to be m>0.5 where the spring constant is over its minimum value. As for the maximum value of m, it is desired not to be greater than 3.0, where spring constant K is kept from becoming too great. The value of m at which spring constant K assumes its minimum value varies with the shape of the spring as the resilient member. It is possible to determine the position of the pivot as the rotation-supporting portion by selecting an optimum spring constant depending on the shape optimizing the stress developed in the spring.

If the design is made such that the center of gravity of the head supporting member including slider 1, flexure 2, supporting arm 3, and balancer 22 comes substantially at the same position as midpoint P (not shown) of a line connecting the tops of two pivots 7 on first base arm 6, head supporting arm 10 constituting stabilized head supporting assembly producing little vibration under the conditions of external shock or the like can be realized. When the center of gravity of head supporting arm 10 is in agreement with midpoint P noted above, head supporting arm 10 having highest shock resistance can be realized. However, even when the center of gravity is off midpoint P, head supporting arm 10 having practically sufficient shock resistance can be provided if the center of gravity is on the line connecting the tops of two pivots 7 on first base arm 6.

SECOND EMBODIMENT

Figure 7:
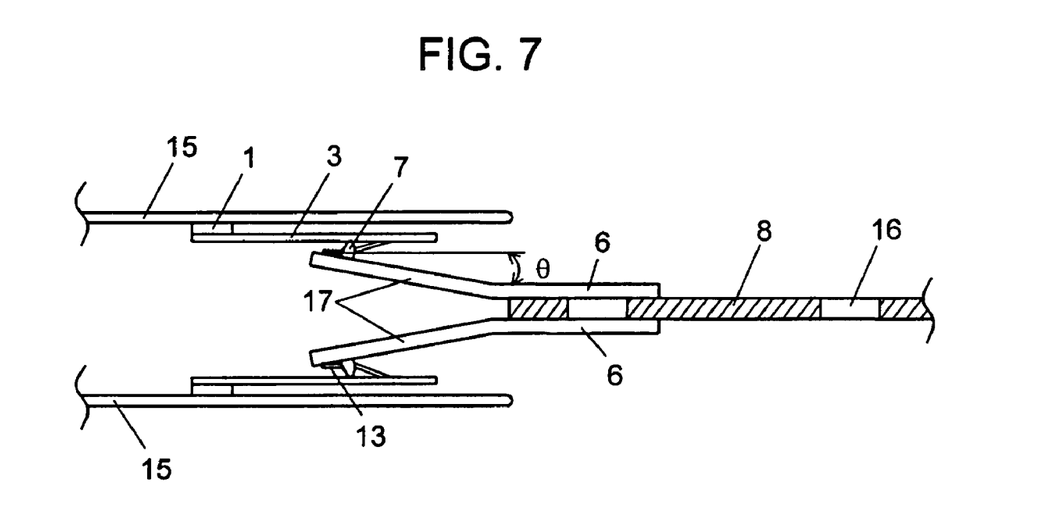
FIG. 7 is a sectional view of a head driving assembly in a second embodiment of the present invention.

FIG. 7 is a sectional view of a head driving assembly according to a second embodiment of the present invention. As shown in FIG. 7, there are provided, for two, upper and lower, magnetic recording media 15, two head supporting assemblies 12 on both faces of one second base arm 8, each assembly being formed of first base arm 6, head supporting arm 10, and the like, similar in basic configuration to that described in the first embodiment. Further, second base arm 8, being in bearing engagement with bearing portion 16, is adapted to be rotated in the radial direction of magnetic recording medium 15 by a driving means, such as a voice coil motor, disposed opposite to second base arm 8 across bearing portion 16. Here, front end portion 17 of first base arm 6 in which fixed portion 13 with plate spring portion 5 is provided is slanted by a predetermined angle θ with respect to the horizontal plane of supporting arm 3.

It is possible to design the angle of slant θ to give slider 1 a pressing force, or urging force, enabling slider 1 to obtain a predetermined flying height in the state where the force allowing slider 1 to fly is generated by rotation of magnetic recording medium 15.

As discussed above, when the position of pivot 7 is set such that the spring constant assumes a minimum value, supporting arm 3 makes parallel displacement. At this time, the pressing force on slider 1 becomes zero. Therefore, in order to obtain a pressing force, it is required to rotate supporting arm 3, from its horizontal state, around the line the connecting two pivots 7.

Then, as shown in FIG. 7, by slanting front end portion 17 in which fixed portion 13 is provided of first base arm 6, or entire first base arm 6, by a predetermined angle with respect to supporting arm 3 and connecting it to plate spring portion 5, a predetermined pressing force on magnetic recording medium 15 can be secured. Thus, for a head supporting assembly, and a head driving assembly using the same, constant pressing force not affected by variations in the height of pivot 7 can be realized.

Although a configuration having first base arm 6 slanted has been described above in the present embodiment, the same effect may be obtained even if the side of second base arm 8 or supporting arm 3 closer to slider 1 than the position of pivot 7 is slanted. Further, instead of bending front end portion 17, plate spring portion 5 may be bent to provide the same effect.

THIRD EMBODIMENT

Figure 8:
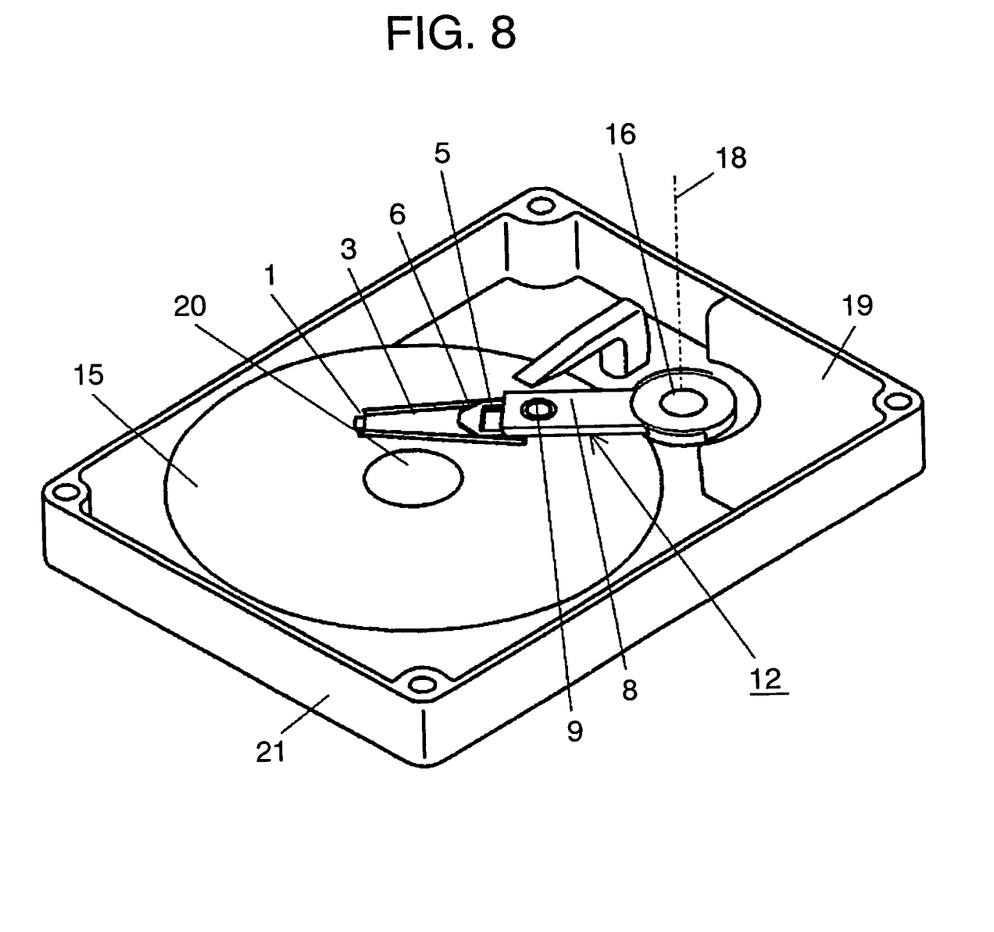
FIG. 8 is a perspective view of a disk drive apparatus in a third embodiment of the present invention.

FIG. 8 is a perspective view of a disk drive apparatus according to a third embodiment of the present invention showing a disk drive apparatus using of head supporting assembly 12 according to the first exemplary embodiment or the second exemplary embodiment. In FIG. 8, components like those in FIG. 1 to FIG. 7 are denoted by like reference numerals.

In FIG. 8, head supporting assembly 12 is made up of supporting arm 3, first base arm 6, second base arm 8, bearing portion 16, and the like, and the same is supported for rotation around center of rotation 18 of bearing portion 16. On the side opposite to first base arm 6 across bearing portion 16, there is provided driving means 19 made, for example, of a voice coil motor. By supplying a controlling current to driving means 19 to drive the same, a magnetic head (not shown) mounted on slider 1 of head supporting assembly 12 can be positioned to a specified track position on magnetic recording medium 15. Incidentally, as driving means 19, such motors as a voice coil motor and a linear motor can be used.

On the other hand, magnetic recording medium 15 can be rotated at a specified number of revolutions by rotary driving means 20. As such rotary driving means 20, a spindle motor, for example, can be used. Housing 21 holds components noted above in predetermined positional relationship and, the same, cooperating with a lid member, not shown, provides hermeticity to prevent the recording medium and the head from being degraded by external corrosive gases and dirt.

According to the present embodiment described above, since the center of gravity of the head supporting member is set at substantially the same position as the midpoint P (not shown) of the line connecting the tops of two pivots 7 on first base arm 6, head supporting assembly producing little vibration under external shock and stabilized in operation can be realized. Accordingly, such a trouble that the slider collides with the surface of the recording medium and thereby causes damage to the magnetic head mounted on the slider or the recording medium can be prevented.

Although, in the above described embodiment, the rotation-supporting portion has been described to be provided by the tops of pivots, such rotation-supporting portion may be made in a wedge-shape or a semi-circular cylindrical shape having a linear contacting portion.

Further, while the pressing force on the slider of the head supporting assembly is increased, flexibility is provided and yet the rigidity of the entire body including the supporting arm can be enhanced. Since such characteristics can be set independently of each other as functions of separate components, the design of head supporting arm can be made easy and the degree of freedom in designing can be increased.

Further, by providing side reinforcement portions on both sides of the supporting arm, or by having the supporting arm formed of a material having high rigidity while having the plate spring portion made of another material having resiliency, the resonance frequency of the supporting arm can be increased. Hence, a vibration mode, which has been a problem in the prior art, is prevented from occurring. Accordingly, settling operation becomes unnecessary and, in addition, it becomes possible to rotate the supporting arm to be positioned quickly, so that the accessing speed of the magnetic recording and reproducing apparatus can be enhanced.

Further, the head supporting assembly is enabled to provide a constant pressing force on the slider not affected by such manufacturing variations as deteriorations in processing precision and assembling precision of the components and to provide a constant force to press the slider, Therefore, a disk drive apparatus with stabilized quality can be provided.

Although a head supporting assembly in a magnetic recording and reproducing apparatus using of a magnetic head has been described in the embodiment of the present invention, the head supporting assembly of the invention provides the same effect even when used as a head supporting assembly for non-contact type disk recording and reproducing apparatuses, such as an optical disk apparatus and a magneto-optic disk apparatus, for example.

As described in the foregoing, the head supporting assembly of the present invention can realize a head supporting assembly being capable of applying a constantly stable urging force to the head and excellent in shock resistance. By the use of such head supporting assembly, a head driving assembly and a disk drive apparatus that are highly reliable, small in size, and light in weight can be realized.

What is claimed is:
1. A head supporting assembly comprising:
    a head for performing at least one of recording and reproduction on a disk provided in a disk plane;
    a head supporting member made up of said head, a head mount with said head mounted thereon, and a supporting arm with said head mount attached to a first end thereof;

a base arm having a rotation-supporting portion for supporting said head supporting member for rotation in a direction toward and away from the disk plane; and a resilient member having a first end thereof connected with a second end of said supporting arm at a connected portion, and a second end thereof fixed to said base arm at a fixed portion for urging said head supporting assembly toward said disk;

wherein said rotation-supporting portion comprises a plurality of pivots provided at a first end of said base arm;

wherein said supporting arm and said base arm are separate members;

wherein said second end of said resilient member is fixed to said first end of said base arm;

wherein said rotation-supporting portion of said base arm is provided at such a position that said head mount is allowed to be displaced relative thereto by pressing of said rotation-supporting portion in a pressing direction;

wherein said resilient member is a plate spring; and wherein said resilient member has length L1 from said connected portion to said fixed portion, the length L1 satisfying a relationship $L2/L1 \geq 10.5$, where L2 is a length from said rotation-supporting portion to said connected portion.

2. The head supporting assembly according to claim 1, wherein
said supporting arm undergoes substantially parallel displacement by pressing of said rotation-supporting portion of said base arm.

3. The head supporting assembly according to claim 2, wherein
a center of gravity of said head supporting member is positioned on a rotation axis of said rotation-supporting portion provided on said base arm.

4. The head supporting assembly according to claim 1, wherein
said resilient member is a plate spring member disposed between said base arm and said supporting arm so as to be bilaterally symmetric.

5. The head supporting assembly according to claim 4, wherein
a center of gravity of said head supporting member is positioned on a rotation axis of said rotation-supporting portion provided on said base arm.

6. The head supporting assembly according to claim 1, wherein
a center of gravity of said head supporting member is positioned on a rotation axis of said rotation-supporting portion provided on said base arm.

7. A head driving assembly comprising:
a head supporting assembly;
a bearing portion for supporting said head supporting assembly for rotation in a direction parallel to the disk plane; and
driving means for rotating said head supporting assembly in the direction parallel to the disk plane;
wherein said head supporting assembly is the head supporting assembly set forth in claim 1.

8. The head driving assembly according to claim 7, wherein
said base arm is arranged at a predetermined angle with said disk surface.

9. A disk drive apparatus comprising:
a disk;
rotative driving means for driving said disk; and
head driving assembly for performing writing information into a predetermined track position of said disk or reading information out of a predetermined track position, wherein
said head driving assembly is the head driving assembly set forth in claim 7.

10. The head supporting assembly according to claim 1, wherein
said pivot portions are provided on a surface of said base arm facing said supporting arm; and
said pivot portions bear against said supporting arm.

11. The head supporting assembly according to claim 1, wherein
said fixed portion is located between said connected portion and said head.

12. A head supporting assembly comprising:
a head for performing at least one of recording and reproduction on a disk provided in a disk plane;
a head supporting member made up of said head, a head mount with said head mounted thereon, and a supporting arm with said head mount attached to a first end thereof;
a base arm having a rotation-supporting portion for supporting said head supporting member for rotation in a direction toward and away from the disk plane; and
a resilient member having a first end thereof connected with a second end of said supporting arm at a connected portion, and a second end thereof fixed to said base arm at a fixed portion for urging said head supporting assembly toward said disk;
wherein said supporting arm is interconnected with said base arm only by said resilient member; and
wherein said rotation-supporting portion of said base arm is provided at such a position that said head mount is allowed to be displaced relative thereto by pressing of said rotation-supporting portion in a pressing direction
wherein said resilient member has length L1 from said connected portion to said fixed portion, the length L1 satisfying a relationship $L2/L1 > 0.5$, where L2 is a length from said rotation-supporting portion to said connected portion.

13. The head supporting assembly according to claim 12, wherein
said rotation-supporting portion comprises at least one pivot portion provided on a surface of said base arm facing said supporting arm; and
said at least one pivot portion bears against said supporting arm to serve as a fulcrum.

14. The head supporting assembly according to claim 12, wherein
said fixed portion is located between said connected portion and said head.

15. The head supporting assembly according to claim 12, wherein
said supporting arm undergoes substantially parallel displacement by pressing of said rotation-supporting portion of said base arm.

16. The head supporting assembly according to claim 12, wherein said resilient member is a plate spring.

17. The head supporting assembly according to claim 12, wherein
a center of gravity of said head supporting member is positioned on a rotation axis of said rotation-supporting portion provided on said base arm.

18. A head driving assembly comprising:

a head supporting assembly;

a bearing portion for supporting said head supporting assembly for rotation in a direction parallel to the disk plane; and driving means for rotating said head supporting assembly in the direction parallel to the disk plane;

wherein said head supporting assembly is the head supporting assembly set forth in claim 12.

19. A disk drive apparatus comprising:

a disk;

rotative driving means for driving said disk; and head driving assembly for performing writing information into a predetermined track position of said disk or reading information out of a predetermined track position, wherein said head driving assembly is the head driving assembly set forth in claim 18.

* * * * *

UNITED STATES PATENT AND TRADEMARK OFFICE
CERTIFICATE OF CORRECTION

PATENT NO. : 7,068,469 B2 Page 1 of 1
APPLICATION NO. : 10/632860
DATED : June 27, 2006
INVENTOR(S) : Hideki Kuwajima et al.

It is certified that error appears in the above-identified patent and that said Letters Patent is hereby corrected as shown below:

Claim 1
Column 9, line 22, change "$L2/L1 \geqq 10.5$" to --$L2/L1 \geqq 0.5$--.

Claim 12
Column 10, line 42, change "$L2/L1 > 0.5$" to --$L2/L1 \geqq 0.5$--.

Signed and Sealed this

Sixth Day of March, 2007

JON W. DUDAS
*Director of the United States Patent and Trademark Office*